United States Patent [19]

Goepfert et al.

[11] Patent Number: 4,683,153

[45] Date of Patent: Jul. 28, 1987

[54] TRANSPARENT LAMINATED POLARIZING GLASSES

[75] Inventors: Serge P. P. Goepfert, Avon; Serge A. M. Renault, Montigny sur Loing; Francoise M. M. Roger, Avon; Jean-Pierre Themont, Montigny sur Loing; Andre J. Vachet, La Genevraye, all of France

[73] Assignee: Corning Glass Works, Corning, N.Y.

[21] Appl. No.: 831,311

[22] Filed: Feb. 20, 1986

[30] Foreign Application Priority Data

Aug. 13, 1985 [FR] France ................................ 85 12322

[51] Int. Cl.$^4$ ........................ C09K 19/00; B32B 17/00
[52] U.S. Cl. ......................................... 428/1; 156/100; 156/103; 156/107; 156/146; 156/153; 156/281; 156/312; 156/314; 156/319; 156/326; 156/329; 156/324.4; 350/320; 350/330; 350/398; 351/177; 427/163; 428/423.3
[58] Field of Search ............... 156/100, 312, 103, 314, 156/107, 319, 146, 326, 153, 329, 281, 324.4; 428/1, 423.3; 427/163; 264/1.3; 351/177; 350/320, 398, 330

[56] References Cited

U.S. PATENT DOCUMENTS

| | | | |
|---|---|---|---|
| 2,481,830 | 9/1949 | Dreyer | 350/398 |
| 2,544,659 | 3/1951 | Dreyer | 350/398 |
| 2,553,961 | 5/1951 | Dreyer | 156/100 |
| 4,154,638 | 5/1979 | Franz et al. | 156/326 |
| 4,261,656 | 4/1981 | Wu | 350/398 |

FOREIGN PATENT DOCUMENTS 1576394 10/1980 United Kingdom ............. 156/324.4

*Primary Examiner*—John J. Gallagher
*Attorney, Agent, or Firm*—C. S. Janes, Jr.

[57] ABSTRACT

This invention is concerned with a method for preparing transparent laminated polarizing glass articles consisting of a support of an inorganic or organic glass, a coating exhibiting polarizing properties disposed on one of the surfaces of the support, and an optically transparent layer adhered to the coating which protects the coating from humidity. The vital feature of the method comprises a first treatment by a gamma-aminopropyltrialkoxysilane and a second treatment by an epoxyalkyltrialkoxysilane which is designed to improve the adherence of the optically transparent layer to the polarizing coating.

The invention is especially useful in the fabrication of eyeglass lenses.

10 Claims, No Drawings

TRANSPARENT LAMINATED POLARIZING GLASSES

BACKGROUND OF THE INVENTION

This invention is concerned with improvements in the fabrication of transparent laminated polarizing glasses which are particularly useful in eyeglass lenses.

U.S. application Ser. No. 734,848, filed May 16, 1985 by Serge P. P. Goepfert, and Gildas J. M. Guillevic under the title LAMINATED TRANSPARENT POLARIZING GLASSES AND METHOD OF MAKING, describes transparent laminated polarizing glass articles comprising:

(a) a support of an inorganic or organic glass;

(b) a coating exhibiting polarizing properties applied to one of the surfaces of the support; and (c) an optically transparent composite film in a single piece consisting on one side, of a ply of thermoplastic polyurethane with adhesive properties and, on the other side, of a ply of thermosetting polyurethane with anti-lacerative and self-regenerating properties, the thermoplastic polyurethane adhering to the coating with polarizing properties.

The support can advantageously be a glass with photochromic properties.

The polarizing coating can be formed of a mixture of three organic colorants corresponding to the three primary colors blue, red, and yellow and exhibiting a nematic state, the aforesaid polarizing coating being of reduced water solubility as a result of an ion exchange treatment through an aqueous acidic solution of inorganic salts.

In the composite film the thermoplastic polyurethane is formed by means of an aliphatic diisocyanate and a diol of an aliphatic diacid polyester or a diol of a polyglycol ether, each of the said diols having a molecular weight of 500–4000; and the thermosetting polyurethane is the product of (a) a polyglycol ether resulting from the combination of an epoxy-1,2-propane with 2,2-bis(hydroxymethyl)1-butanol and containing 10.5–12% by weight of free hydroxyls, and (b) a biuret of 1,6-hexamethylene diisocyanate containing 21–22% by weight of isocyanate groups, the weight of said biuret comprising between 0.9–1.1 times the weight of said polyglycol ether, the thickness of the thermoplastic polyurethane being of 0.01–0.8 mm and the thickness of the thermosetting polyurethane being of 0.2–0.8 mm.

If desired, the composite film can be subjected to a coloration treatment.

A process for the fabrication of transparent laminated polarizing glass articles is also described in the above patent application.

In U.S. application Ser. No. 717,829, filed Mar. 29, 1985 in the names of Serge P. P. Goepfert, Serge A. M. Renault, and Francoise M. M. Roger under the title of IMPROVEMENTS IN THE MANUFACTURE OF LAMINATED TRANSPARENT, POLARIZING GLASSES, is described an improved process for fabricating transparent laminated polarizing glass articles comprising the following steps:

(a) forming parallel microgrooves in a surface of the inorganic or organic glass support with the help of a slightly abrasive brushing of the said support prior to applying the polarizing coating thereon;

(b) carefully washing and drying this surface of the support prior to applying the polarizing coating thereon;

(c) depositing a mixture of three organic colorants corresponding to the three primary colors and exhibiting a nematic state on the washed and dried surface of the support;

(d) treating the polarizing coating to reduce the water solubility of the coating by immersing it into an aqueous solution of inorganic salts having an acid pH; and (e) applying a composite polyurethane film by first subjecting it to moderate conditions of temperature and pressure in order to assure a gradual spreading out free from wrinkles and an adherence of the film to the polarizing coating; then to elevated conditions of temperature and pressure in order to strengthen the mechanical bond between the film and the coating and to achieve reticulation of the composite film, this process comprising the supplementary step consisting of placing the product resulting from Step (d) above in contact with an aqueous solution free of organic co-solvent prepared from at least one compound chosen from among gamma-aminopropyltrimethoxysilane and gamma-aminopropyltriethoxysilane, the silane representing 0.1–10% by volume of the solution and the aqueous solution having a pH in the range of 10–11.2.

The duration of the silane treatment can be from 2–60 minutes at a temperature not exceeding 30° C. This treatment is followed by rinsing in water and a heat treatment between 80°–140° C. for a duration of 15–60 minutes, for example.

The object of the silane treatment is to strengthen the resistance of the bond between the polarizing coating and the glass support, on the one hand, and between the polarizing coating and the composite polyurethane film, on the other hand, thereby permitting better conditions of spreading of the film and also dispensing with the need to apply a layer of resin on the edge of the laminated glass, as instructed in the above patent application.

Notwithstanding the strengthening of the bonding forces, the laminated glass prepared in accordance with U.S. application Ser. No. 717,829 still exhibited certain deficiencies of bond. Delamination around the periphery of the glass composite sometimes becomes apparent in wearing and because of aging:

in particularly harsh atmospheric conditions, such as high relative humidity coupled with a high temperature (tropical and equatorial climate); and under the effect of the condensation of perspiration which varies according to the individual.

SUMMARY OF THE INVENTION

One objective of the present invention is to provide an improved process for fabricating transparent laminated polarizing glasses which palliates the deficiencies of previous processes.

Another objective of the present invention is to develop variations in the preparation of the said transparent laminated polarizing glasses.

Most particularly, the invention is concerned with a process for manufacturing transparent laminated polarizing glasses consisting of a support of an inorganic or organic glass, a coating exhibiting polarizing properties disposed on one of the surfaces of the support, and an optically transparent layer adhered to the coating having polarizing properties and which protects the coating from humidity, said process comprising the following steps:

(a) forming parallel microgrooves in a surface of the support of inorganic or organic glass with the help of a slightly abrasive brushing of the said support prior to applying the polarizing coating thereon;

(b) carefully washing and drying that surface of the support prior to applying the polarizing coating thereon;

(c) depositing a mixture of three organic colorants corresponding to the three primary colors and exhibiting a nematic state on the washed and dried surface of the support;

(d) treating the resultant polarizing coating to reduce the water solubility of the coating by immersing it into an aqueous solution of inorganic salts having an acid pH;

(e) treating the product resulting from Step (d) above with an aqueous solution free of organic co-solvent prepared from at least one compound chosen from among gamma-aminopropyltrimethoxysilane and gamma-aminopropyltriethoxysilane, the silane representing 0.1–10% by volume of the solution and the aqueous solution having a pH in the range of 10–11.2, this treatment being followed by a rinsing in water and a heat treatment between 80°–140° C.;

(f) placing the product resulting from Step (e) in contact with an aqueous solution of an epoxyalkyltrialkoxysilane, then rinsing in water followed by a condensation and/or partial polymerization of the epoxyalkyltrialkoxysilane; and (g) applying an optically transparent, inorganic or organic protective layer to form a barrier against humidity, said application requiring a heat treatment at elevated temperature or irradiation with ultraviolet rays.

Steps (a)–(e) of the process are carried out in conformity with the patent applications cited above which can be referred to for more details and whose teachings are incorporated here by reference. In fact, it appears unnecessary to repeat here the detailed descriptions provided in those previous applications.

Step (f), which is the basis of the present invention, is conducted with an aqueous solution, free from organic co-solvent, of an epoxyalkyltrialkoxysilane. Numerous epoxyalkyltrialkoxysilane have been described in the literature as being useful coupling agents for improving the bonding between various surfaces. Among these, it was found that gamma-glycidoxypropyltrimethoxysilane (abbreviated as γ-GOPTMES) having the formula

was the preferred epoxyalkyltrialkoxysilane because of the good results obtained therewith, and because of its commercial availability (it is sold commercially among others under the name of SILANE A187 by Union Carbide Corporation).

It is advantageous to utilize a 1–4% by volume aqueous solution, preferably 1–3% by volume, especially about 2% by volume of γ-GOPTMES, the solution having a pH of 5–5.5. It is possible to use aqueous solutions of higher concentrations, for example 10% by volume, of γ-GOPTMES, but the results are less consistent and most often less good, because they produce a very significant hydrolysis reaction which causes turbidity in the bath and a deposit on the walls of the tanks. Furthermore, the aqueous solution evolves gases therefrom with the result that the final laminated glass composite has varying properties. Preferably, the prepared aqueous solution will be left to age for several hours, for example about 24 hours, before using. This is done to bring about the hydrolysis of the alkoxy groups in the silanol groups. Contact with the aqueous solution of γ-GOPTMES is advantageously effected at temperatures not exceeding about 30° C. (in order to avoid too strong a reaction with the silane polarizing coating), preferably at room temperature. The contact can be carried out simply through immersion of the glasses in the solution. The duration of the immersion is not very critical. As indicative of that fact, it has been found that contact times of 15–60 minutes, preferably about 30 minutes, are suitable. After contact, the glass is rinsed in running water, then with distilled water in order to avoid all traces of calcium carbonate that may appear during the drying which follows. The object of these rinsing operations is to eliminate excess silane, in the same manner as after Step (e), and to allow only the necessary quantity of active silane to remain. An overly intensive and too long time rinsing should be avoided under the penalty of very significant desorption of the layer formed by the present treatment or an irregular desorption which causes stains and optical defects in the final product.

For the same reason of desorption one then carries out a fast rapid drying in air, then a drying for a maximum of 30 minutes at temperatures advantageously within the range of 80°–100° C. This drying seeks to eliminate residual humidity while causing a partial condensation of the silane molecules. Drying temperatures outside of the 80°–100° C. range have the tendency of slightly degrading the polarizing effect and/or the resistance to delamination of the final glass and, therefore, are not preferred.

Step (g) consists in the application of an optically transparent protective layer onto the polarizing coating successively treated by the two types of silane, as mentioned above, to form a barrier against humidity for the said polarizing coating which is very sensitive to humidity. This step can be carried out in various ways. A first method consists of applying an optically transparent composite film in a single piece consisting, on one side, of a ply of thermoplastic polyurethane having adhesive properties, and, on the other side, of a ply of thermosetting polyurethane having anti-lacerative and self-regenerating properties, the thermoplastic polyurethane ply adhering to the coating having polarizing properties previously treated with the silanes as described in the applications cited above. A second method consists of cementing to the polarizing coating treated with silanes a small coquille of inorganic glass having a form (curve) which is adapted to that of the inorganic or organic glass support with the aid of conventional optical cements. A third method consists of applying onto the polarizing coating treated with silanes a preformed film or a layer formed in situ, for example, through centrifugation or molding, of a synthetic polymer material having anti-lacerative and self-regenerative properties capable of forming a barrier against humidity and assuring, at the same time, protection of the laminated glass against mechanical damage. Examples of synthetic polymer materials are polyacrylic materials (particularly polymethacrylates) and polyurethanes.

Step (g), regardless of the nature of the protective layer applied, will involve a heating step at an elevated temperature or irradiation with ultraviolet rays to perfect the polymerization (condensation) of the silanes applied through Steps (e) and (f) and to insure excellent adhesion, on the one hand, of the protective layer to the polarizing coating, and, on the other hand, of the latter to the glass support. When Step (g) requires a heating step, the temperature attained can be between about 100°–130° C., for example.

The two successive treatments of Steps (e) and (f) prescribed for the different types of silanes provide to the final laminated glass a resistance to delamination under the same very harsh testing conditions which cannot be obtained by each of the treatments alone.

Hence, it was found that the laminated glass products conforming to the invention exhibit the following advantages:

(a) they exhibit an improved protective layer-polarizing coating-support adherence after an accelerated aging process of 120 hours at 98% relative humidity at 50° C. (see Example 2); and (b) they exhibit a lower risk of delamination at the edges under aggressive testing conditions such as:
  (1) an immersion of 4.5 hours in water at room temperature agitated by ultrasonic vibrations (Example 3);
  (2) an immersion of 2 hours in a bath of acid perspriation agitated by ultrasonic vibrations (Example 4);
  (3) an immersion of 4 hours in a bath of alkaline perspiration agitated by ultrasonic vibrations (Example 5), and
  (4) they resist without damage an immersion of 1.5 hours in boiling water.

In other respects, the laminated glass products conforming to the invention, when compared to the laminated glass products conforming to Ser. No. 717,829 cited above, are not significantly altered. They exhibit polarization between 50–98% and optical transmittances under 2 mm between 25–45%, those characteristics being a function of the quantity of polarizing molecules, their structure, and their dichroic effect. These products conform perfectly to all the standards in force in the area of eyeglass lenses.

The laminated glasses of the invention can, moreover, undergo edging operations without special precautions, that is, without the preheating recommended in Ser. No. 734,848, supra.

The following non-limiting examples are given in order to illustrate the present invention.

DESCRIPTION OF PREFERRED EMBODIMENTS

To provide a comparison, a first series of transparent laminated polarizing glasses was prepared comprising:

(a) a support of an inorganic photochromic glass marketed by Corning Glass Works, Corning, N.Y., under the trademark PHOTOGRAY® EXTRA;

(b) a polarizing coating as described in the example of Ser. No. 734,848, supra, treated by gamma-aminopropyltrimethoxysilane as described in Ser. No. 717,829, supra; and (c) a composite polyurethane film as described in the previously-cited patent applications.

Then a second series of glasses identical to the previously-described first series was prepared. After the treatment by gamma-aminopropyltrimethoxysilane, an additional treatment was applied consisting of an immersion of 0.5 hour at room temperature in a 2% by volume aqueous solution of gamma-glycidoxypropyltrimethoxysilane, followed by a rinse in running water for two minutes and a rinse in distilled water for several seconds, and, finally, drying for 0.5 hour at 100° C. in a drying oven.

EXAMPLE 1

The total transmittance and the polarization effect were measured on the two series of glasses thus prepared following the standard ANSI A 8013-1977. The results are reported in Table 1 below.

EXAMPLE 2

Samples of the two series were maintained for 120 hours in a humidity cabinet at 98% relative humidity and a temperature of 50° C. At the conclusion of the test the samples were set at rest for seven days in a normal environment at 60%±10% relative humidity and 23° C.±2° C. The adherence of the composite polyurethane film to its glass support + polarizing coating was measured by the pulling force necessary for tearing off at a rate of 30 mm/minute a small strip of the composite film 1 cm wide precut on the sample. The force of tearing is expressed in terms of Newton/centimeter (N/cm). The results are recorded in Table 1.

EXAMPLE 3

Samples of each of the two series were plunged into an ultrasonic bath operating at a frequency of 26 KHz containing water maintained at a constant temperature of 20° C. utilizing a cooling coil. The period of the test was 4.5 hours after which the samples were visually examined by reflection and with a polariscope in order to check for edge delaminations. The delaminated surface is expressed in terms of percent of the total surface of the eyeglass lens subjected to the test. The results are given in Table I.

EXAMPLE 4

Samples from each of the two series were plunged for two hours into an ultrasonic bath operating at a frequency of 26 KHz containing artificial perspiration having a pH of 4.5. The temperature of the bath passed progressively from 20°–60° C. during the period of the test. The composition of this artificial acidic perspiration was derived from the composition proposed in ASTM D23-22-69 concerning the resistance of dyed leathers to artificial perspiration. The composition of the artificial perspiration is as follows:

For a liter of distilled water:
9 grams NaCl
1.67 grams urea
86 grams sodium lactate
0.165 gram disodium phosphate
pH adjusted to 4.5 by lactic acid Table 1 records the results of edge delamination observed with respect to Example 3 expressed in terms of percentage of surface delaminated.

EXAMPLE 5

Samples of each of the two series of glasses were placed for four hours in the same type of ultrasonic bath as in Example 4, but containing artificial perspiration having pH of 8.8. The temperature of the bath passed progressively from 20°–70° C. The composition of this alkaline artificial perspiration is that defined in DIN 63160 and consists of:

For one liter of distilled water:
4.2 grams NaHCO3
0.5 gram NaCl
0.2 gram K2CO3

TABLE 1

|  |  | First Series | Second Series |
|---|---|---|---|
| Example 1 | Transmission % | 39.5 ± 0.2 | 39.7 ± 0.6 |
|  | Polarization effect % | 87.9 ± 0.8 | 87.9 ± 0.4 |
| Example 2 | Adhesion after accelerated aging | 7.2 N/cm | 9.2 N/cm |
| Example 3 | Percentage of surface delamination | 15–20% | ~1% |
| Example 4 | Percentage of surface delamination | 20–25% | <1% |
| Example 5 | Percentage of surface delamination | ~10% | <1% |

EXAMPLE 6

A transparent laminated polarizing glass was prepared comprising:

(a) a support of an inorganic photochromic glass having the composition of PHOTOGRAY ® EXTRA brand glass;

(b) a polarizing coating as described in the example of Ser. No. 734,848, supra, treated successively by (1) gamma-aminopropyltrimethoxysilane as described in Ser. No. 717,829, supra, and (2) γ-GOPTMES under the conditions specified hereinafter; and (c) a coquille of Corning 0211 glass marketed by Corning Glass Works, Corning, N.Y. (a borosilicate glass), cemented to the treated polarizing coating of Step (b) with Loctite ® 350 cement, marketed by Loctite Corporation, Newington, Conn., hardened through exposure to ultraviolet radiation for several minutes.

In Example 6, treatment (2) consists of an immersion of 0.5 hour at room temperature in a 2% by volume aqueous solution of γ-GOPTMES, followed by rinsing in running water for two minutes and in distilled water for several seconds, and, thereafter, drying for 0.5 hour at 100° C. in an oven.

The resultant laminated glass exhibited an optical transmittance of 37.8%, a polarization effect of 93.3%, and did not demonstrate any sign of delamination in the tests described with respect to the preceding examples. It also evidenced very good resistance to attack by boiling water.

Furthermore, it should be noted that the inventive laminated glasses can subsequently be colored, if desired, by the process described in U.S. Pat. No. 4,454,170. Therefore, it is possible to easily produce desirable products, namely, polarizing photochromic glasses easily tintable and able to cut off ultraviolet radiation, and to have the most varied forms and curves without any constraint.

Finally, whereas special reference has been made to the use of the inventive laminated glasses in eyeglass lenses, the usefulness of the inventive glasses is not limited to that area of application. In fact, such glass can find excellent application in other areas, for example, as windows for vehicles (automobiles, boats, trucks) or for buildings, as cover glasses in digital readout devices utilized in electronic, instrumentation, and clock applications under the term "liquid crystal display", or as lenses for optical instruments such as profile projectors. In general, the invention is useful in all areas where the polarization of incident or reflected light can bring comfort or increased technical capabilities to the users.

It goes without saying that the method of production described is only an example and can be modified, particularly through the substitution of equivalent techniques, without leaving the framework of the invention.

We claim:

1. A method for fabricating a transparent laminated polarizing glass consisting of a support of an inorganic or organic glass, a coating exhibiting polarizing properties disposed on one of the surfaces of the support, and an optically transparent layer adhered to the coating exhibiting polarizing properties and which protects the coating from humidity, said method comprising the following steps:

(a) forming parallel microgrooves in a surface of the inorganic or organic glass support prior to applying the polarizing coating thereon with the help of a slightly abrasive brushing of the support;

(b) carefully washing and drying that surface of the support prior to applying the polarizing coating thereon;

(c) depositing on that washed and dried surface of the support a mixture of three organic colorants corresponding to the three primary colors and exhibiting a nematic state;

(d) treating the resultant polarizing coating to reduce the water solubility of the coating by immersing into an aqueous solution of inorganic salts having an acid pH;

(e) treating the resultant product of Step (d) above with an aqueous solution free of organic co-solvent prepared from at least one compound chosen from among gamma-aminopropyltrimethoxysilane and gamma-aminopropyltriethoxysilane, the silane representing 0.1–10% by volume of the solution and the aqueous solution having a pH in the range of 10–11.2, this treatment being followed by a rinsing in water and a heat treatment between 80°–140° C.;

(f) placing the resultant product of Step (e) above in contact with an aqueous solution of an epoxyalkyltrialkoxysilane and then rinsing in water followed by a condensation and/or partial polymerization of the epoxyalkyltrialkoxysilane; and (g) applying an optically transparent, inorganic or organic protective layer to form a barrier against humidity, that application requiring a heat treatment at elevated temperature or irradiation with ultraviolet rays.

2. A method according to claim 1 wherein the silane utilized in Step (f) is gamma-glycidoxypropyltrimethoxysilane.

3. A method according to claim 2 wherein the gamma-glycidoxypropyltrimethoxysilane represents 1–4% by volume of the aqueous solution.

4. A method according to claim 3 wherein the gamma-glycidoxypropyltrimethoxysilane represents about 2% by volume of the aqueous solution.

5. A method according to claim 1 wherein the period of contact with the aqueous silane solution in Step (f) is 15–60 minutes.

6. A method according to claim 1 wherein the contact with the aqueous silane solution in Step (f) is conducted at a temperature not exceeding 30° C.

7. A method according to claim 1 wherein, after contact with the aqueous silane solution in Step (f), rinsing is carried out at room temperature for about two minutes in running water and then for several seconds in distilled water.

8. A method according to claim 1 wherein, after rinsing, the product of Step (f) is subjected to a first rapid drying in air and then a second drying at a temperature of 80°–100° C. for a maximum time of 0.5 hour.

9. A method according to claim 1 wherein the condensation and/or polymerization of the silane layer produced in Step (f) is perfected in the course of Step (g) by a heat treatment process or irradiation by ultraviolet rays.

10. A transparent laminated polarizing glass produced in accordance with claim 1.

* * * * *